United States Patent
Ohwa

(10) Patent No.: US 7,106,471 B2
(45) Date of Patent: Sep. 12, 2006

(54) INFORMATION DISTRIBUTION SYSTEM AND INFORMATION DISTRIBUTION SERVICE

(75) Inventor: Yasushi Ohwa, Machida (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 896 days.

(21) Appl. No.: 10/028,732

(22) Filed: Dec. 28, 2001

(65) Prior Publication Data

US 2004/0044558 A1    Mar. 4, 2004

(51) Int. Cl.
*G06F 3/12* (2006.01)

(52) U.S. Cl. .................. 358/1.15; 358/402; 705/14

(58) Field of Classification Search ................ 709/201; 358/402; 434/350; 399/27; 347/7, 19
See application file for complete search history.

(56) References Cited

U.S. PATENT DOCUMENTS

| | | | | |
|---|---|---|---|---|
| 5,725,384 A | * | 3/1998 | Ito et al. | 434/350 |
| 5,802,420 A | * | 9/1998 | Garr et al. | 399/27 |
| 6,580,966 B1 | * | 6/2003 | Shimada | 700/223 |
| 2002/0055877 A1 | * | 5/2002 | Ariga et al. | 705/14 |
| 2002/0083114 A1 | * | 6/2002 | Mazzagatte et al. | 709/100 |

OTHER PUBLICATIONS

U.S. Appl. No. 09/803,037, filed Mar. 12, 2001, Ohwa.

* cited by examiner

*Primary Examiner*—Mark Zimmerman
*Assistant Examiner*—Vincent M. Rudolph
(74) *Attorney, Agent, or Firm*—Foley & Lardner LLP

(57) ABSTRACT

An information distribution system includes a distribution server which distributes information, and distribution terminals each of which receives the distribution information and outputs the distribution information from a user interface in a predetermined output form, wherein the distribution information includes an object information element and a control information element which controls the user interface so as to return response information to the distribution server, the response information being generated by a user in response to the distributed object information element, and each of the distribution terminals includes a user interface control for controlling the user interface in accordance with the control information element so as to return the response information to the distribution server, and medium output for outputting the object information element of the received distribution information on a recording medium.

12 Claims, 12 Drawing Sheets

FIG.2

ADVERTISER MANAGEMENT TABLE ST1

| ADVERTISER ID | ADVERTISER NAME | ADDRESS | PLACE OF CONTACT | WITHDRAWAL ACCOUNT | USE FEE |
|---|---|---|---|---|---|
| 0 | XXX | AABB | xxx-xxx | xxxxx | ¥32,000 |
| 1 | YYY | CCDD | xxx-xxx | xxxxx | ¥51,000 |
| 2 | ZZZ | EEFF | xxx-xxx | xxxxx | ¥73,000 |
|   |   |   |   |   |   |
|   |   |   |   |   |   |
|   |   |   |   |   |   |

FIG.3

ADVERTISEMENT MANAGEMENT TABLE AT1

| ADVERTISEMENT ID | ADVERTISER ID | TARGET GROUP ID | POINTER TO ADVERTISEMENT DATA | ADVERTISEMENT DISTRIBUTION NUMBER | RESPONSE PROCESSING NUMBER |
|---|---|---|---|---|---|
| 0 | 3 | 5 | *** | ×× | ×× |
| 1 | 11 | 7 | *** | ×× | ×× |
| 2 | 7 | 10 | *** | ×× | ×× |
|   |   |   |   |   |   |
|   |   |   |   |   |   |

FIG.4

FACSIMILE LENDING CONTRACTOR MANAGEMENT TABLE CT1

| CONTRACTOR ID | NAME | AGE | SEX | ADDRESS | PLACE OF CONTACT | DISTRIBUTION-DESTINATION | OCCUPATION | WORK PLACE | EXPENDABLE RECOVERING METHOD | TRANSFER ACCOUNT | FIELD OF INTEREST SPORT | FIELD OF INTEREST TRAVEL | ... | ADVERTISEMENT PRINTED TIMES | EXPENDABLE USED NUMBER | RESPONSE PROCESSING NUMBER |
|---|---|---|---|---|---|---|---|---|---|---|---|---|---|---|---|---|
| 0 | XX XX | 30 | MALE | AA BB | xxx-xxx | △△△-△△△ | | xxx-xx | TRANSFER TO ACCOUNT | xxxxxx | ○ | × | | 523 | 532 | 5 |
| 1 | YY YY | 25 | FEMALE | CC DD | xxx-xxx | △△△-△△△ | | – | TRANSFER TO ACCOUNT | xxxxxx | ○ | ○ | | 375 | 377 | 13 |
| 2 | ZZ ZZ | 60 | MALE | AA EE | xxx-xxx | △△△-△△△ | | – | SENDING EXPENDABLES | – | × | ○ | | 152 | 161 | 7 |
| | | | | | | | | | | | | | | | | |
| | | | | | | | | | | | | | | | | |
| | | | | | | | | | | | | | | | | |

FIG.5

TARGET GROUP NANAGEMENT TABLE TT1

| TARGET GROUP ID | AGE RANGE | SEX | RESIDENCE AREA | FIELD OF INTEREST | | | CONTRACTOR ID LIST |
| --- | --- | --- | --- | --- | --- | --- | --- |
| | | | | SPORT | TRAVEL | .... | |
| 0 | 10-39 | BOTH | KANTO | ○ | × | | 0, 1, 23, 55, 101, ·· |
| 1 | 20-29 | FEMALE | WHOLE COUNTRY | × | ○ | | 1, 22, 30, 45, ·· |
| 2 | 50-90 | BOTH | 23 WARDS IN TOKYO | × | × | | 5, 7, 31, 35, 47, ·· |
| | | | | | | | |
| | | | | | | | |

FIG. 7

| Q1. AGE RANGE |

⊙ ALL   ○ ---   ○ TEENS ○ 20-24 ○ 25-29 ○ 30-34 ○ 35-39
○ FORTIES ○ FIFTIES ○ SIXTIES ○ SEVENTIES ○ EIGHTY OR MORE

| Q2. SEX |

⊙ BOTH   ○ MALE   ○ FEMALE

| Q3. RESIDENCE AREA |

⊙ ALL   ○ HOKKAIDO ○ TOHOKU ○ HOKURIKU ○ KANTO ○ ⋯
○ TOKYO 23 WARDS ○ YOKOHAMA ○ ⋯
○ ⋯

| Q4. HOBBY |

⊙ ALL   ○ SPORT ○ TENNIS ○ SKI   ○ SOCCER
○ OUTDOOR ○ FISHING ○ ⋯
○ INDOOR ○ ⋯
○ ⋯

| Q5. JOB |

⊙ ALL   ○ ⋯
○ ⋯

INFORMATION DISTRIBUTION SYSTEM AND INFORMATION DISTRIBUTION SERVICE

BACKGROUND OF THE INVENTION

1. Field of the Invention

The present invention relates to an information distribution system and an information distribution service. The present invention is preferably used for, for example, a case where advertisement or commercial information is provided by using a facsimile terminal.

2. Description of Related Art

In conventional art, providing material for advertisement or commercial (hereinafter, material for advertisement or commercial is referred to as "advertisement material") to a specific customer has been conducted by mail, such as direct mail, or by directly inserting the advertisement material in the customer's mailbox by hand (hereinafter, referred to as "direct posting"). In recent years, a method of using electronic mail via a PC (personal computer) or cellular phone is employed.

However, the conventional advertisement method of employing mail, such as direct mail, or direct posting is problematic in that costs needed for advertisement material, such as costs for printing the advertisement material itself and the envelope used therefor, are increased. Also, this method is problematic in that it is impossible to flexibly change the content of advertisement according to the respective customers, and that a long time is needed from shipping to delivery.

The other conventional method of employing electronic mail via a PC or cellular phone has the following problem. Specifically, the transmission capability is so poor and the screen size is so small that sufficient amount of advertisement image cannot be transmitted. Accordingly, limitations are imposed on the data size, and expressiveness, of the advertisement image. In the case of employing a PC, a further problem arises that it is rare for a customer to read the received electronic mail timely, thus lowering promptness.

The reason for the problem of the electronic mail employing a PC is as follows: Regarding electronic mail, unlike cellular phones each of which often has a function of sending, upon receipt of an electronic mail, the receipt notification and/or the body of the electronic mail to the cellular phone, PCs lack such a function. Accordingly, the user usually fails to know even the receipt of an electronic mail until he performs an operation to take out the electronic mail from the receiving mailbox.

Note that even with either the direct mail or the electronic mail via a PC or cellular phone, it is difficult to confirm that the user has surely seen the content of the advertisement and accordingly the effect of the advertisement (hereinafter, occasionally referred to as "advertisement effect") has been produced, thus lowering reliability. For example, it may happen that most of the delivered direct mails are discarded without being read, and that most of received electronic mails are deleted without being read.

Further, in the case of a cellular phone and PC, an advertisement, which contains an image other than a text, is distributed in the form a file attached to an electronic mail (hereinafter, a file attached to an electronic mail will be referred to as "attached file"). However, if data form of the attached file does not conform to the data form which can be treated by the mailer provided in the cellular phone or PC, which has received distribution of the advertisement (throughout the present specification, distribution of advertisement is occasionally "advertisement distribution"), it is likely to happen that the user cannot see the advertisement normally. Therefore, it may happen that the number of the users who have actually seen the advertisement gets smaller than the number of the destinations to which the advertisement is distributed. Accordingly, it is difficult to forecast or manage the advertisement effect.

SUMMARY OF THE INVENTION

The present invention is accomplished to eliminate the above-mentioned problems. It is therefore an object of the present invention to provide an information distribution system and an information distribution service each of which is flexible, rich in expressiveness, and superior in promptness, and easy to manage.

A first aspect of the present invention provides an information distribution system including a distribution server which distributes predetermined distribution information, and a distribution terminal which receives the distribution information distributed from the distribution server and outputs the distribution information from user interface means in a predetermined output form, wherein the distribution information includes an object information element which is an object of the distribution and an objective of the output, and a control information element which controls the user interface means so as to return response information to the distribution server, the response information being generated by a user in response to the distributed object information element, and the distribution terminal includes user interface control means for controlling the user interface means in accordance with a content of the control information element so as to return the response information to the distribution server, and medium output means for outputting the object information element of the received distribution information in the form of recording on a predetermined recording medium.

A second aspect of the present invention provides an information distribution service including a distribution server which distributes predetermined distribution information, and a distribution terminal which receives the distribution information distributed from the distribution server and outputs the distribution information from user interface means in a predetermined output form, wherein the distribution information includes an object information element which is an object of the distribution and an objective of the output, and a control information element which controls the user interface means so as to return response information to the distribution server, the response information being generated by a user in response to the distributed object information element, and the distribution terminal includes user interface control means for controlling the user interface means in accordance with a content of the control information element so as to return the response information to the distribution server, and medium output means for outputting the object information element of the received distribution information in the form of recording on a predetermined recording medium.

BRIEF DESCRIPTION OF THE DRAWINGS

FIG. 2 is a schematic view showing an example of a configuration of advertiser management table for use in the advertisement distribution system according to the embodiment of the present invention;

FIG. 3 is a schematic view showing an example of a configuration of the advertisement management table for use in the advertisement distribution system according to the embodiment of the present invention;

FIG. 4 is a schematic view showing an example of a configuration of a facsimile lending contractor management table for use in the advertisement distribution system according to the embodiment of the present invention;

FIG. 5 is a schematic view showing an example of a configuration of a target group management table for use in the advertisement distribution system according to the embodiment of the present invention;

FIG. 7 is a schematic view showing an example of a configuration of a window for questionnaire for use in the advertisement distribution system according to the embodiment of the present invention;

BEST MODE FOR CARRYING OUT THE INVENTION

Hereinafter, a preferred embodiment of the present invention will be described by way of a case where the information distribution system and information distribution service according to the present invention are applied to an advertisement distribution system.

Figure 1:
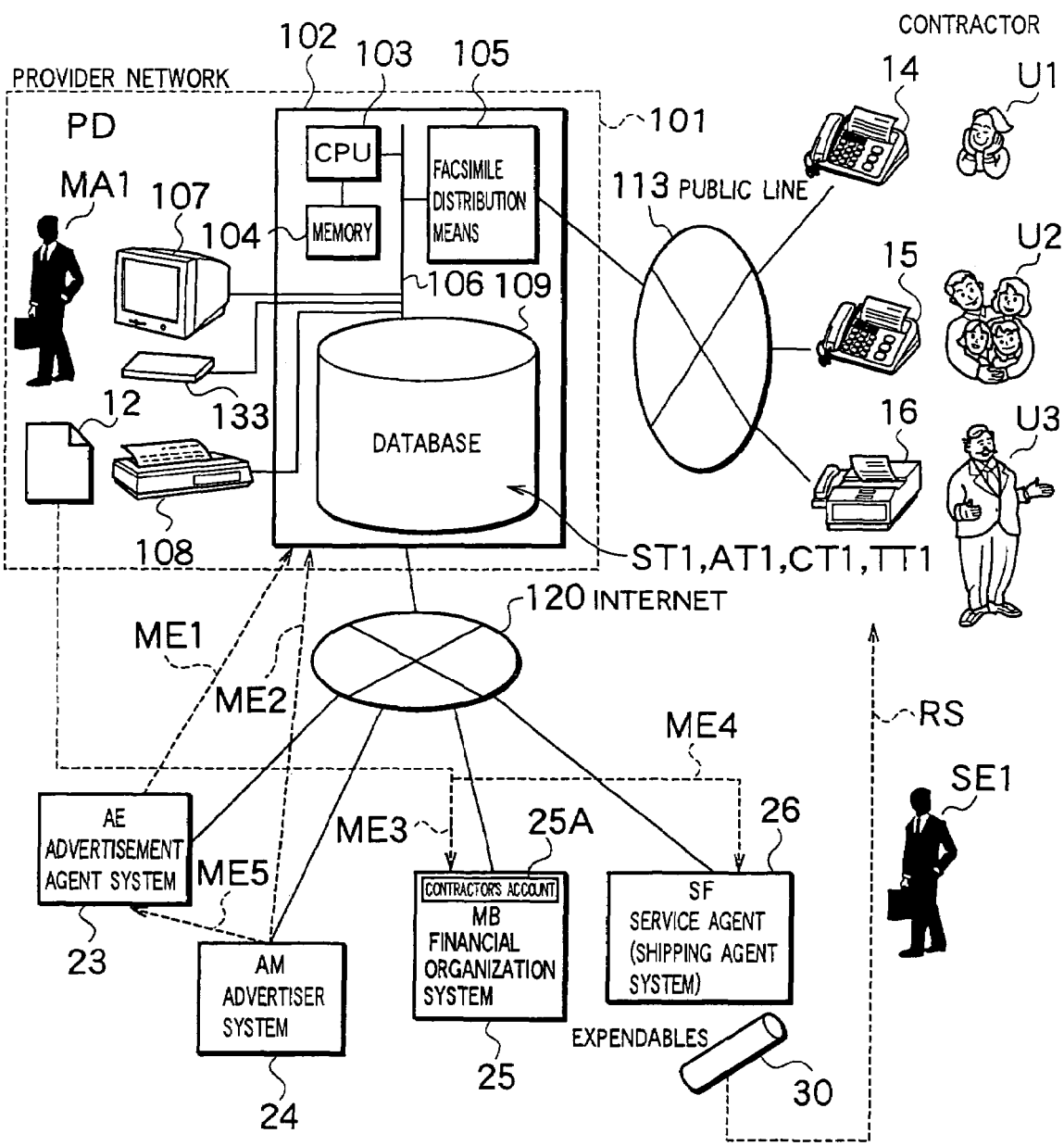
FIG. 1 is a schematic view showing an internal configuration of an advertisement distribution system according to an embodiment of the present invention.

An overall configuration of an advertisement distribution system according to the present embodiment is shown in FIG. 1.

In FIG. 1, the advertisement distribution system includes a provider network 101, a public line 113, the Internet 120, facsimile terminals 14 to 16, an advertisement agent system 23, an advertiser system 24, a financial organization system 25, and a service dealer (shipping service dealer) system 26.

More specifically, the provider network 101 includes therein an advertisement distribution server 105, a monitor device 107 which monitors operations of the advertisement distribution server 105 and conducts the maintenance thereof, a keyboard 133, and a printer device 108. The monitor device 107, keyboard 133, and printer device 108 are used by a network manager, an operator MA1, and so on who exist on the provider side.

The advertisement distribution center server 105 includes therein a facsimile distribution means 105, a CPU (central processing unit) 103, a memory 104, a database 109, and a common bus 106 which connects these members to one another. To the common bus 106, the monitor device 107, keyboard 133, and printer device 108 are also connected.

The facsimile distribution means 105 is a unit which is loaded with a communication function to communicate via the public line 113 with the facsimile terminals 14 to 16 provided at homes, offices, or the like, of the users U1 to U3. While it is assumed in this embodiment that there are three users, the number of the users may be smaller or greater than three. Usually, user of the number much greater than three exist in the advertisement distribution system.

For the public line 113, an analogue telephone line, and various types of digital lines can be employed. Examples of the digital line include: a type employing line switching, such as ISDN (integrated services digital network) (excluding packet switching service); and a type employing a store-and-forward switching, such as packet switched network. Alternatively, a facsimile communication network, which is a type of store-and-forward switching network, may be used as the public line 113.

The facsimile distribution means 105 may be so configured as to be loaded with functions capable of coping with all the above-mentioned lines. Alternatively, as necessary, the means 105 may be so configured as to cope with only one of the above-mentioned lines. In the case of the store-and-forward switching network, such as packet switched network and facsimile communication network, the network itself (specifically, relay devices provided within the network) has many functions. Accordingly, it is possible that a part of the functions necessary for the advertisement distribution system according to the present embodiment are replaced or supplemented by the functions of the network.

A provider PD, who manages and operates the provider network 101, concludes, after obtaining various types of personal information of the contractors (i.e., the users U1 to U3), facsimile lending contracts with the contractors U1 to U3, and lends the facsimile terminals 14 to 16 to the contractors U1 to U3 free of charge or for a very small fixed charge. In exchange for it, advertisements, which are distributed from the provider network 101 via the public line 113, are output in the form of printing (hereinafter, output in the form of printing will be referred to as "print-output") from the facsimile terminals 14 to 16 provided at the contractors' homes or offices.

Resources (i.e., paper, ink, and so on) consumed in the printing of advertisements are recovered by supplying resources itself the same as the actually consumed ones to the contractors U1 to U3 free of charge, or by transferring the actual expense for the consumed resources to the accounts of the contractors U1 to U3 in the financial organization. Each of the contractors U1 to U3 can select his preference out of these two ways when he concludes the facsimile lending contract with the provider PD.

As a way for the provider PD to obtain personal information of the contractors U1 to U3, a way can be mentioned in which the provider PD asks a contractor to enter (fill in) a questionnaire when the contractor visits the provider's store for purchasing a facsimile terminal or for concluding a lending contract on a facsimile terminal. This way will be made more efficient by automating the entering of a questionnaire through a Web page. Specifically, a Web page having a window as shown, for example, in FIG. 7 is provided, and the contractor answers the questionnaire through the Web page. Note that, in this case, it is necessary that a Web server, which enables the users to browse the Web page having a window as shown in FIG. 7, be provided within the provider network 101, and that the respective users U1 to U3 gain access to the Web server by using a personal computer or the like loaded with a Web browser.

In the case where the Web server is used, efficiency can be more enhanced by adopting a manner that the conclusion of the lending contraction is also conducted through the Web server. As necessary, the functions of the Web server may be provided within the advertisement distribution server 102.

An advertisement, which is distributed from the provider network 101 to the facsimile terminals 14 to 16, is provided, after the conclusion of a contract on the advertisement, from an advertiser AM to the provider PD as data ME 2 of the advertisement. Alternatively, depending on cases, the advertisement is provided to the provider PD in a manner that the advertiser AD requests, by means of a signal ME5, an advertisement agent AE to prepare data ME1 of the advertisement, and then the data ME 1 thus prepared is provided to the provider PD.

The advertisement agent system 23 shown in FIG. 1 is a communication system which is managed by the advertisement agent AE. Similarly, the advertiser system 24 is a communication system which is managed by the advertiser AM; the financial organization system 25 is a communication system which is managed by a financial organization MB; and a service dealer (shipping service dealer) system 26 is a communication system which is managed by a service dealer or shipping service dealer 5F.

Data and signals ME1 to ME5 may be exchanged automatically via a communication network. Alternatively, as required, the exchange of data and signals ME1 to ME5 may be realized in a manner that a letter of request or the like are exchanged via delivery by hand or via mail.

It is thought to depend on the respective contractors U1 to U3 whether or not the contractors U1 to U3 welcome the outputs of the advertisements from their facsimile terminals 14 to 16. Nevertheless, the advertisement distributing system according to the present embodiment has a great advantage as described below. The facsimile terminals 14 to 16 can be used, in addition to being used for outputting distributed advertisements, as ordinary facsimile terminals which allow users, including the contractors U1 to U3, to conduct ordinary facsimile transmission. In view of the foregoing, the facsimile terminals 14 to 16 may be sold, instead of being lent free of charge or for a very small fixed charge, at almost the same price as that of other facsimile terminals having an equivalent functional specification.

On the other hand, the database 109 stores therein an advertiser management table ST1 shown in FIG. 2, an advertisement management table AT1 shown in FIG. 3, a facsimile lending contractor management table CT1 shown in FIG. 4, and a target group management table TT1 shown in FIG. 5.

In FIG. 2, data items of the advertiser management table ST1 include: advertiser ID which uniquely identifies an advertiser within the advertisement distribution system; advertiser's name indicative of the name of the advertiser; address indicative of the address or location of the advertiser; place of contact indicative of place of contact of the advertiser, i.e., a place where contact to the advertiser can be made; use fee indicative of advertisement fee which the advertiser is requested to pay, the advertisement fee being calculated in accordance with a predetermined procedure on the basis of the advertisement size (i.e., the number of pages, and the dimensions, of the advertisement), whether or not response processing is executed, the number of destinations of advertisement distribution, and so on; and a withdrawal account number indicative of a number of an account used for withdrawing the use fee.

Particularly important items among the data items shown in FIG. 2 are the advertiser ID, withdrawal account, and use fee. The remaining data items are not necessarily essential (that is, although these remaining data items are important in terms of management of the customers, it is not necessarily needed to provide the remaining data items within the advertiser management table ST1), so that, as required, the remaining data items may be replaced by data items other than those shown in the figure.

In FIG. 3, the data items in the advertisement management table AT1 include: advertisement ID which uniquely identifies an advertisement within the advertisement distribution system; the advertiser ID; target group ID which uniquely identifies a target group, i.e., a set of users who are targets of the advertisement within the advertisement distribution system; pointer to advertisement data, the pointer indicating a physical (or logical) storage location (for example, location on a hard disk (or nonvolatile storage means) (not shown)) of advertisement data, such as image data serving as the body of an advertisement; advertisement distribution number indicative of the number of facsimile terminals to which advertisement distribution is conducted; and response processing number indicative of the number of facsimile terminals which have surely returned response information among facsimile terminals which have received the advertisement distribution.

Since all the data items shown in FIG. 3 are important, so that basically they cannot be omitted nor replaced. However, depending on cases, the pointer to the advertisement data may be replaced by a data item ("advertisement data") which has, as its value, the advertisement data itself instead of a pointer.

In FIG. 4, the data items in the facsimile lending contract management table CT1 include: contractor ID which uniquely identifies a contractor within the advertisement distribution system; name indicative of the name of the contractor; age indicative of an age of the contractor; sex indicative of whether the contractor is male of female; address indicative of the address of the contractor; place of contact indicative of a place of contact of the contractor, i.e., a place where contact to the contractor can be made; distribution-destination indicative of a facsimile number used for conducting advertisement distribution to the contractor; work place indicative of a work place of the contractor; expendable recovering method indicative of a method of recovering expendables (i.e., consumed resources), such as paper, ink, and so on, which are consumed during printing of advertisements; transfer account information indicative of a number of an account to which transfer is conducted, the item of transfer account being filled in only for contractors who have designated the item of transfer to account as the expendable recovering method; field of interest, such as sport, travel, etc., indicative of a hobby or taste of the contractor; advertisement printed times indicative of how many times advertisements are print-output from the facsimile terminal lent to the contractor (i.e., the total number of the pages requiring printing in the advertisement data); expendable used number indicative of the degree of consumption of the expendables (i.e., how many expendables have been consumed as a result of print-outputting), the degree of consumption progressing as the print-outputting progresses; and the response processing times mentioned above.

With respect to most of the data items in the facsimile lending contractor management table CT1, their values are registered on the basis of the personal information obtained from each of the contractors when the facsimile terminal lending contract is concluded. The values (personal information) of the data items as to the respective contractors are utilized for setting the above-mentioned target groups, and for judging whether or not a contractor belongs to a target group.

Particularly important data items among the data items shown in FIG. 4 in terms of the constitution of the present embodiment are: the contractor ID; the distribution-destination; the expendable recovering method; the transfer account; the field of interest, such as sport, travel, and so on; the advertisement printed times; the expendable used number; and response processing number. The remaining data items are not necessarily essential, so that, as required, the remaining data items may be replaced by data items other than those shown in the figure.

Note that the distribution-destination may be common to the place of contact.

In FIG. 5, the data items in the target group management table TT1 include: target group ID which uniquely identifies a target group within the advertisement distribution system; age group indicative of a range of ages of the contractors who belong to a concerned target group; sex indicative of a sex of the contractors who belong to a concerned target group; residence area indicative of an area of residences of the contractors who belong to a concerned target group; field of interest such as sport, travel, and so on, of the contractors who belong to a concerned target group; and contractor ID list which lists contractor IDs of the contractors who belong to a concerned target group.

Particularly important data items in terms of the constitution of the present embodiment among the data items shown in FIG. 5 are the target group ID and the contractor ID list. The remaining data items are not necessarily essential (that is, although the data indicated by the remaining data items are important in terms of management of the contractors, it is not necessarily needed to provide these data items within the target group management table TT1), so that, as required, the remaining data items may be replaced by data items other than those shown in the figure.

Since each of the tables shown in FIGS. 2 to 5 can be regarded as a relational table, it is, not to mention, preferred, in terms of improving efficiency of the database management, that each table is subjected to normalization up to third normal form regardless of the arrangement of the table shown in the figure. Management of the database 109 is conducted by DBMS (Data Base Management System) (not shown).

Figure 6:
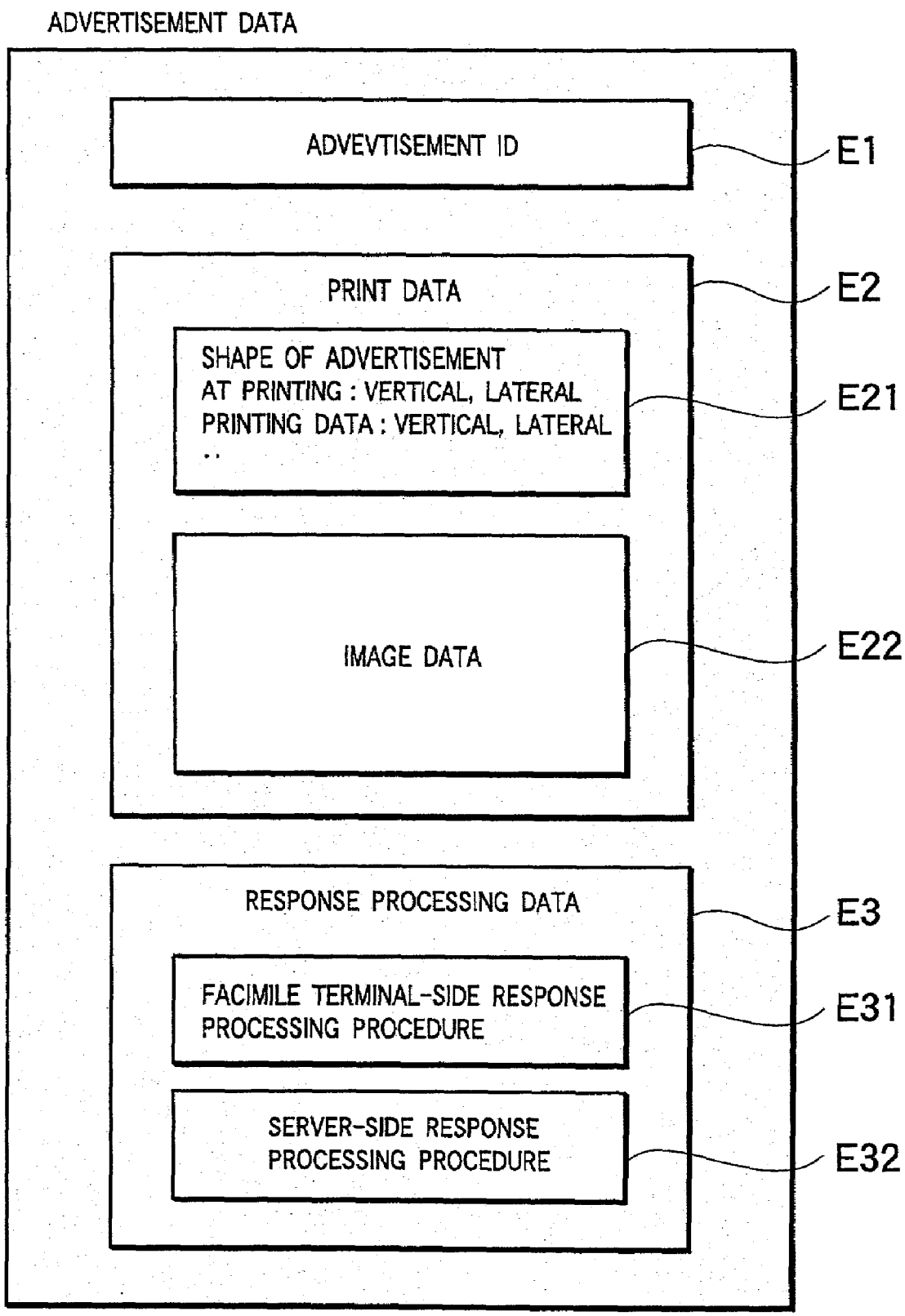
FIG. 6 is a schematic view showing an example of a configuration of advertisement data for use in the advertisement distribution system according to the embodiment of the present invention.

FIG. 6 shows an example of the arrangement of the advertisement data, the storage location of which is designated by means of the pointer to the advertisement data in the advertisement management table AT1 shown in FIG. 3.

In FIG. 6, the advertisement data includes: an advertisement ID section E1 in which the advertisement ID is disposed; a print data section E2 in which print data, which serves as a main part of the advertisement, is disposed; and a response processing data section E3 in which a processing procedure related to the above-mentioned response information is described.

More specifically, the print data section E2 includes: a print attribute portion E21 in which a shape, vertical and lateral dimensions at the time of printing, and so on, of the advertisement are described; and an image data portion E22 in which image data, which is a main part of the advertisement, is disposed. The response processing data portion E3 includes: a facsimile terminal-side response processing procedure portion E31 in which a response processing procedure to be performed at the side of the facsimile terminals 14 to 16 is described; and a server-side response processing procedure portion E32 in which a response processing procedure to be performed at the side of the advertisement distribution server 102 is described. The response processing procedures at the facsimile terminal side response processing procedure portion E31 and at server-side response processing procedure portion E32 can be described, for example, in the JCL (Job Control Language).

Note that the sever-side response processing portion E32 can be omitted from the advertisement data to be distributed, for the following reason: The response processing procedure described in the server-side response processing procedure portion E32 is performed by the advertisement distribution server 102. Accordingly, it is sufficient for the advertisement distribution server 102 itself to grasp a relationship between the procedure to be executed at the advertisement distribution server 102 and the response sent from a facsimile terminal (e.g., facsimile terminal 14).

The image data disposed in the image data portion E22 includes not only actual advertisement which actually constitutes a content of an advertisement, such as images, figures, and characters, but also a response sheet serving as a questionnaire in which the user's response is to be entered. The actual advertisement and the response sheet may be arranged on the same print-output page in a manner that the actual advertisement is disposed at a part of the page while response sheet is disposed at another part of the same page. However, it is assumed here that the response sheet is print-output on a page independent of and separate from the page on which the actual advertisement is print-output. On the response sheet, which is print-output on the sheet P2 (see FIG. 9), a predetermined bar code, for example, is printed as a mark indicating that the sheet is a response sheet. The printing of the bar code is conducted on the basis of the print data disposed in the print data section E2, not to mention.

The contents of the questionnaire may include, as well as the user's comment or opinion on the advertisement, an application (entry) conducted by the user for an invitation (e.g., help wanted, job offer) offered by the advertiser, and a reservation for something conducted by the user.

Note that, with respect to the vertical and transversal dimensions at the time of printing, which is described at the print attribute portion E21, it is possible to designate any of the A4 size and larger sizes (e.g., B4 size), which have been utterly unable to be realized in cellular phones (A cellular phone usually has, inclusive of its screen, dimensions of approximately 40 mm in width, 130 mm in height, and 20 mm in thickness.), and which has been often difficult even in PCs.

Figure 9:
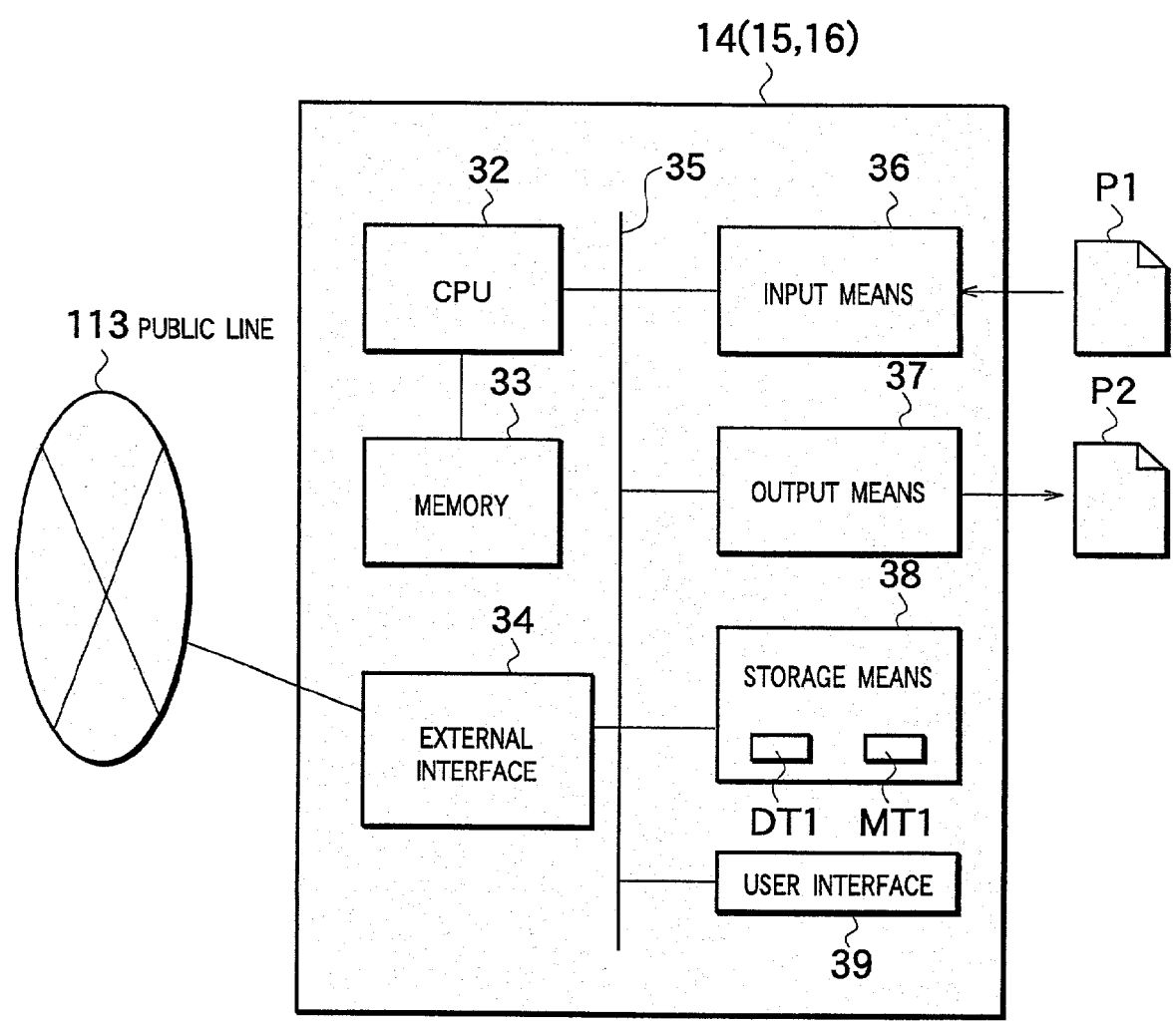
FIG. 9 is a schematic view showing an example of a hardware configuration of the facsimile terminal for use in the advertisement distribution system according to the embodiment of the present invention.

The facsimile terminals 14 to 16, which are provided at homes, offices, or the like, of the user U1 to U3, can take a basic hardware configuration as shown in, for example, FIG. 9. The facsimile terminals 14 to 16 do not need to be of the same type, and instead may have different functional specifications from one another.

Figure 11:
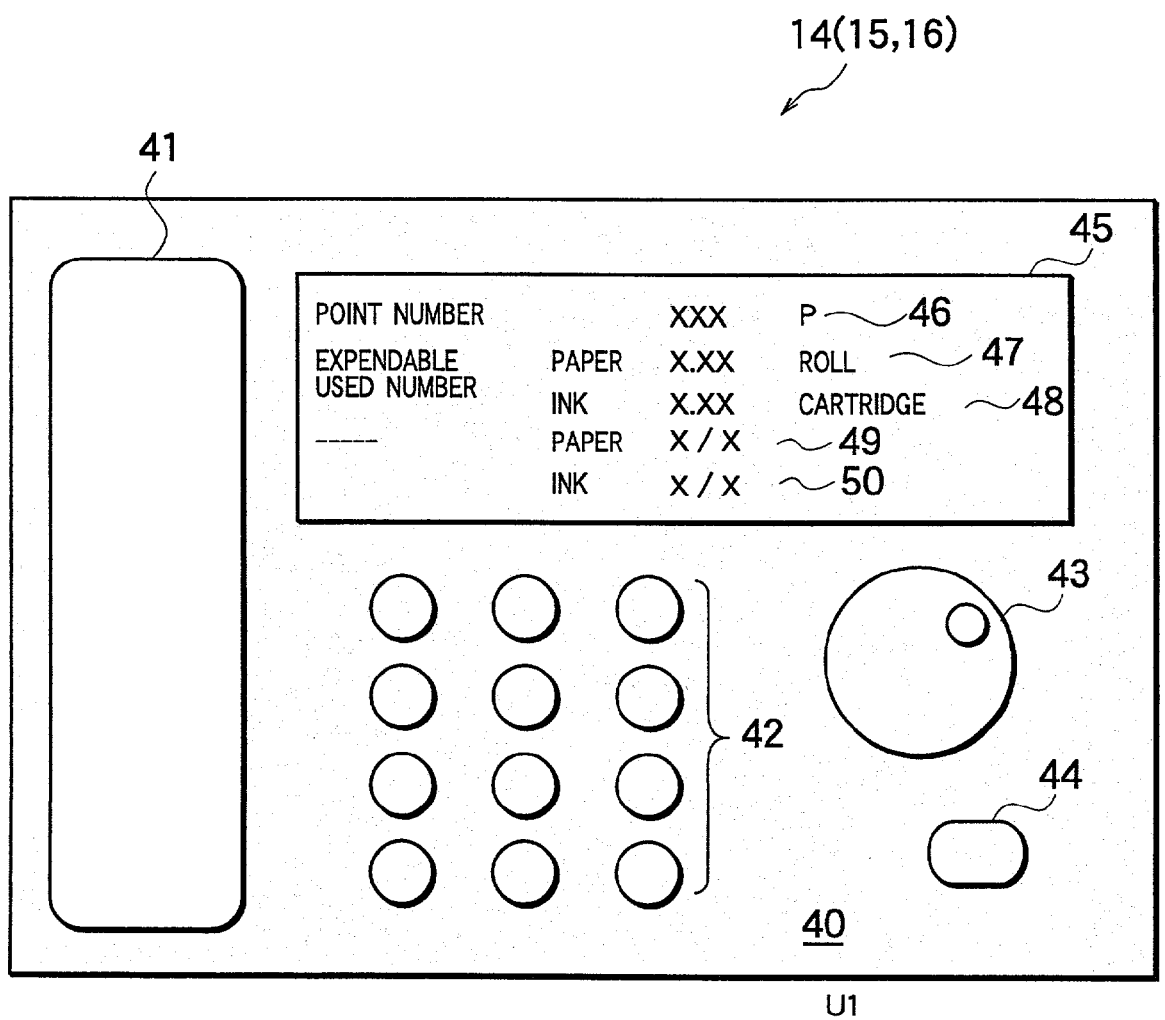
FIG. 11 is a plan view showing an example of an external appearance of a facsimile terminal for used in the advertisement distribution system according to the embodiment of the present invention.

Similarly, each of the facsimile terminals 14 to 16 may take an external appearance as shown in, for example, FIG. 11. The external appearance is more likely to vary depending on the terminals than the basic hardware configuration because the differences in machine type and functional specification are more likely to be reflected in the external appearance. However, it is assumed here that all the facsimile terminals 14 to 16 take the external appearance shown in FIG. 11.

Accordingly, it can be understood that FIG. 9 shows the internal configurations of all the facsimile terminals 14 to 16, and that FIG. 11 shows the external appearances of all the facsimile terminals 14 to 16. However, the following explanations will be made assuming that FIG. 9 shows chiefly the internal configuration of the facsimile terminal 14, and that FIG. 11 shows chiefly the external appearance of the facsimile terminal 14.

In FIG. 9, the facsimile terminal 14 includes a CPU 32, a memory 33, an external interface 34, a common bus 35, input means 36, output means 37, storage means 38, and a user interface 39.

More specifically, the CPU 32 is a central processing unit of the facsimile terminal 14.

The external interface 34 is an interface which functions when the facsimile terminal 14 communicates with the advertisement distribution server 102 via the public line 113. It goes without saying that the external interface 34 functions also when the facsimile terminal 14 is used as an ordinary facsimile terminal, not as a constituent element of the advertisement distribution system. That is, the external interface 34 functions also when the facsimile terminal 14 communicates with a communication device (e.g., another facsimile terminal) other than the advertisement distribution server 102.

The memory 33 is a primary memory unit which stores program codes and data read and written by the CPU 32. To the storage means 38, a buffer memory, which temporarily stores data at the time of transmission or receipt, and a hard disk serving as a secondary memory are applicable. A response processing management table MT1 and an expendable management table DT1 are stored in the hard disk.

The response processing management table MT1 is a table which stores and preserves the response processing procedure obtained from the facsimile terminal-side response processing procedure portion E31 in the advertisement data shown in FIG. 6.

In general, it is sufficient that the response management table MT1 be kept preserved until response processing is executed for returning response information corresponding to the received advertisement data. However, it is probable that, for example, if another advertisement having a response sheet (questionnaire portion) of completely the same layout is received, it will be necessary to execute completely the same response processing procedure. In view of such a case, a the following configuration may be adopted. Specifically, a judgement is made as to whether or not the response processing procedure for a new response is the same as any one of the response processing procedure already stored. When a judgment is made that such a sameness is found and therefore the concerned stored response processing procedure can be reused, only the information that such reuse can be conducted is written in the hard disk without writing the response processing procedure itself in the hard disk. This configuration will enhance the processing efficiency.

However, since details of the response processing basically differ depending on advertisement data, a long-term operation of the advertisement distribution system may cause a problematic situation in which the response processing management tables occupy most of the storage capacity of the hard disk. The problematic situation is likely to arise, for example, in a case where deletion of the response processing table MT1 is not conducted immediately after the execution of the response processing. A good solution for this problematic situation is to adopt a configuration in which, when the storage capacity used for storing the response processing management tables reaches a predetermined value, a new response processing management table is overwritten on an old response processing management table so as to prevent the storage capacity, used for storing the response processing management tables, from exceeding the predetermined value.

The expendable management table DT1 is a table which manages expendable used number indicative of consumption degree of sheet, ink, and so on consumed for the printing of the advertisements. The value of the expendable used number (consumption degree) increases gradually spreading over a long period of time, so that it is necessary to preserve the table DT1 for a long period of time and to update it each time print-outputting is conducted. As necessary, the current value of the expendable used number is transmitted to the advertisement distribution server 102.

The input means 36 is a unit which inputs, at the time of transmission, the diagram (i.e., all the information) recorded on a surface of the sheet (manuscript) P1 as image data. The input image data is temporarily stored in the buffer memory, and then sent via the external interface 34 to the public line 113. As necessary, the image data may be sent from the external interface 34 directly to the public line 113, that is, without being temporarily stored in the buffer memory.

The output mean 37 is a unit which outputs, at the time of receipt, a diagram in the form of recording (printing) on the surface of the sheet P2. The data, on which the diagram to be printed on the sheet P2 is generated, is obtained by directly receiving the data from the external interface 34 or by reading the data from the buffer memory which has stored the data obtained through the external interface 34.

The user interface 39 is an interface in a narrow sense which is directly observed by sight or operated by the user U1, the interface 39 including a control panel 45, and a button 46, shown in FIG. 11. Note that the user interface in a broad sense includes the input means 36 and output means 37.

In FIG. 11, the button 46 is a button which is operated, for example, when, at the time of transmission, a facsimile number of the transmission-destination (i.e., destination of transmission) is designated. The control panel 45 is a display unit which is constituted by, for example, a liquid crystal display unit. As necessary, the control panel 45 may be constituted by a touch panel through which the user U1 can input.

While the items to be displayed in the control panel 46 is not restricted to those shown in FIG. 11, point number, expendable used number, and next scheduled date for replacement of the expendables, are displayed in the control panel 46.

Hereinafter, the operations of the present embodiment having the above-mentioned configuration will be described.

The operations of the present embodiment are shown in the flowcharts of FIGS. 8, 10, 12 and 13.

Figure 8:
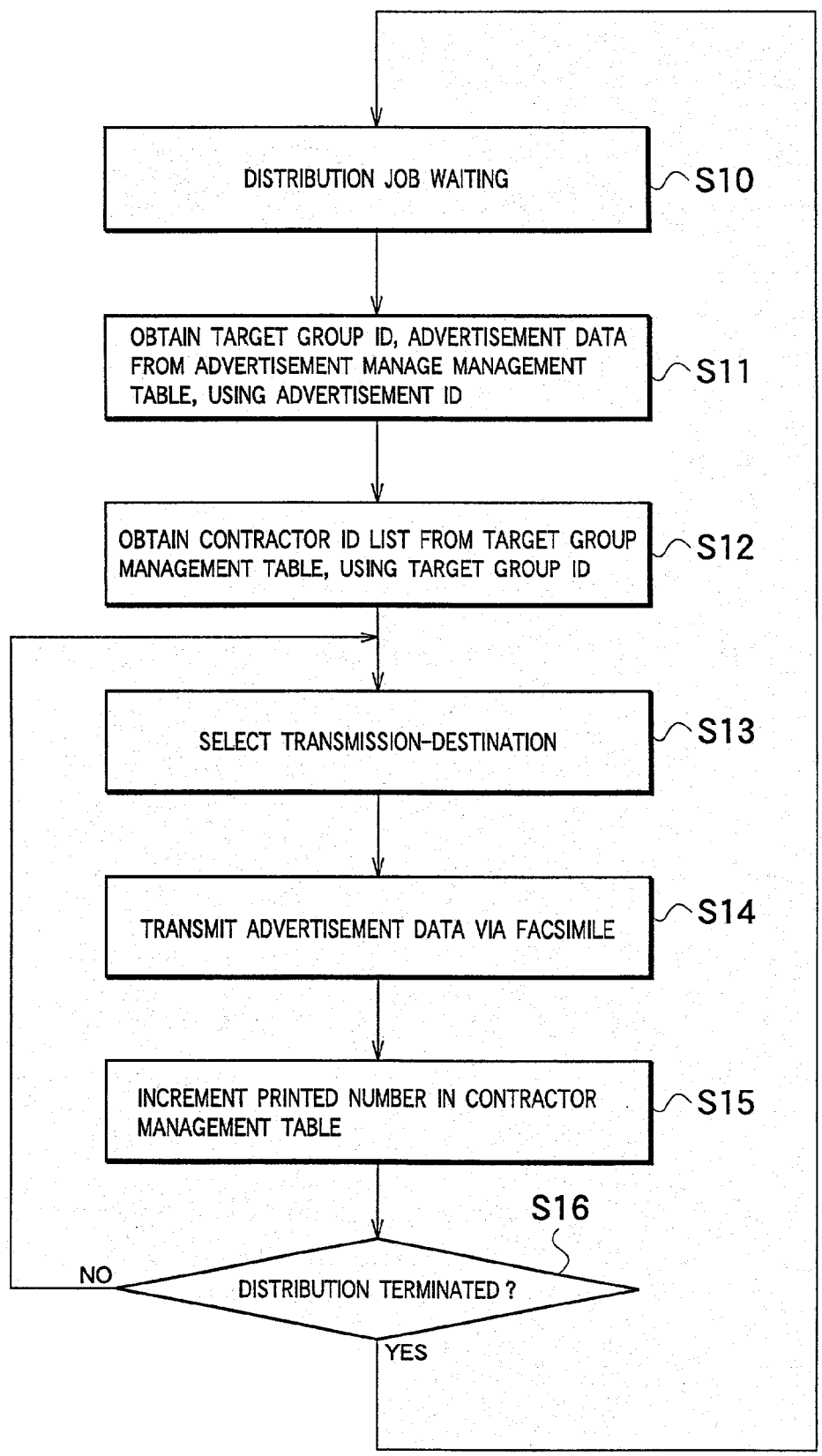
FIG. 8 is a flowchart showing operations of the advertisement distribution system according to the embodiment of the present invention.
Figure 10:
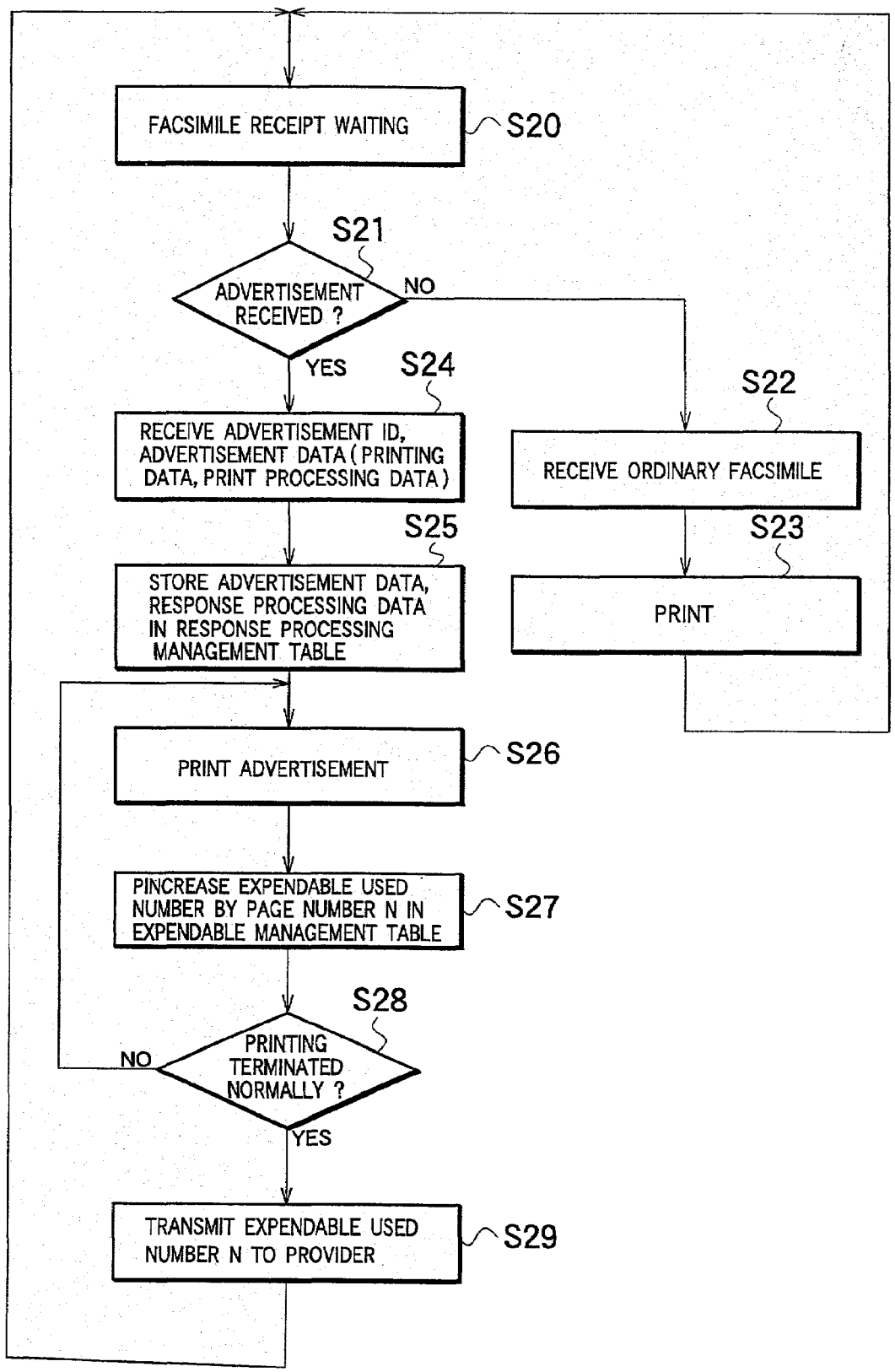
FIG. 10 is a flowchart showing an operation of the facsimile terminal for use in the advertisement distribution system according to the embodiment of the present invention.
Figure 12:
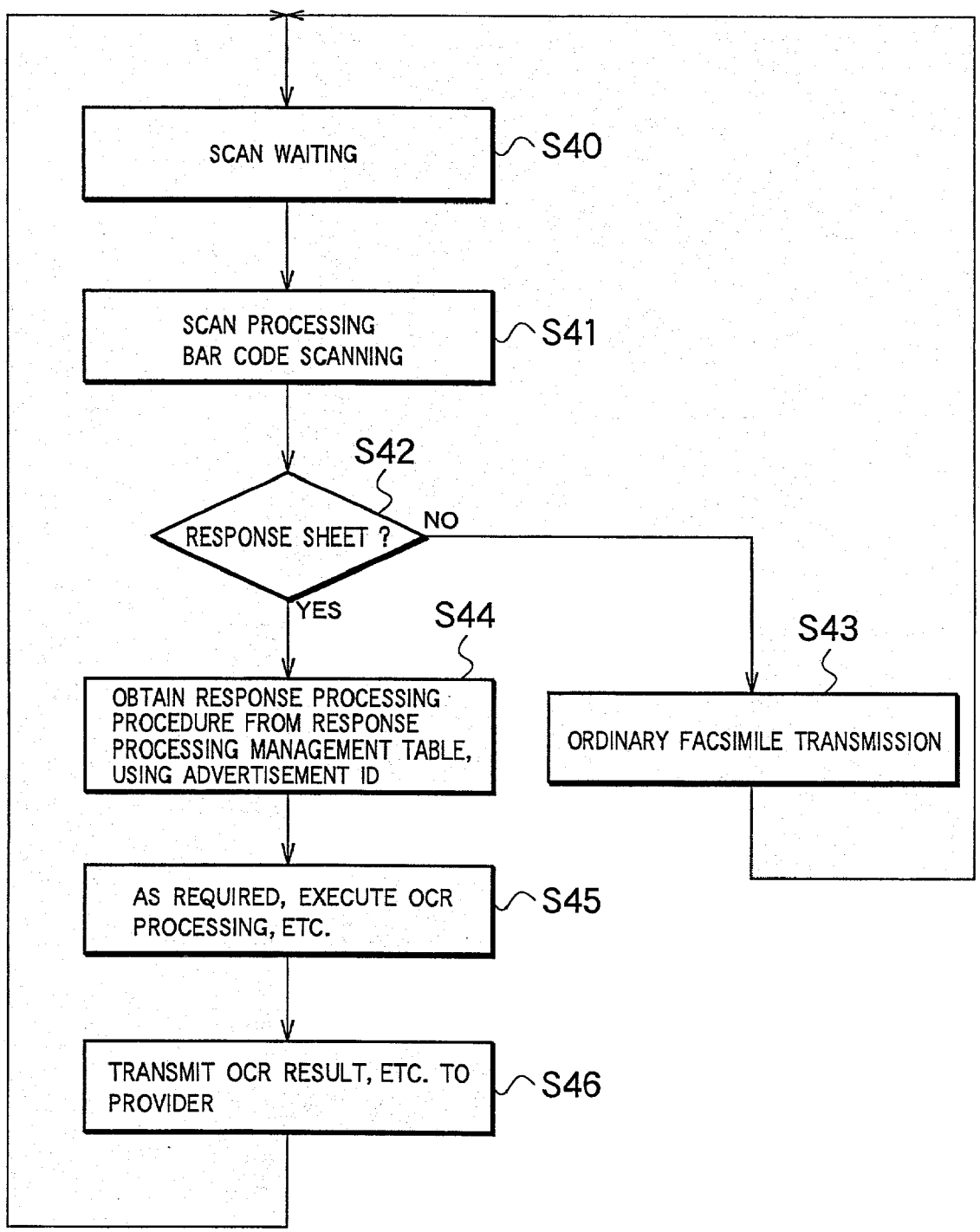
FIG. 12 is a flowchart showing of an operation of a facsimile terminal for use in the advertisement distribution system according to the embodiment of the present invention.
Figure 13:
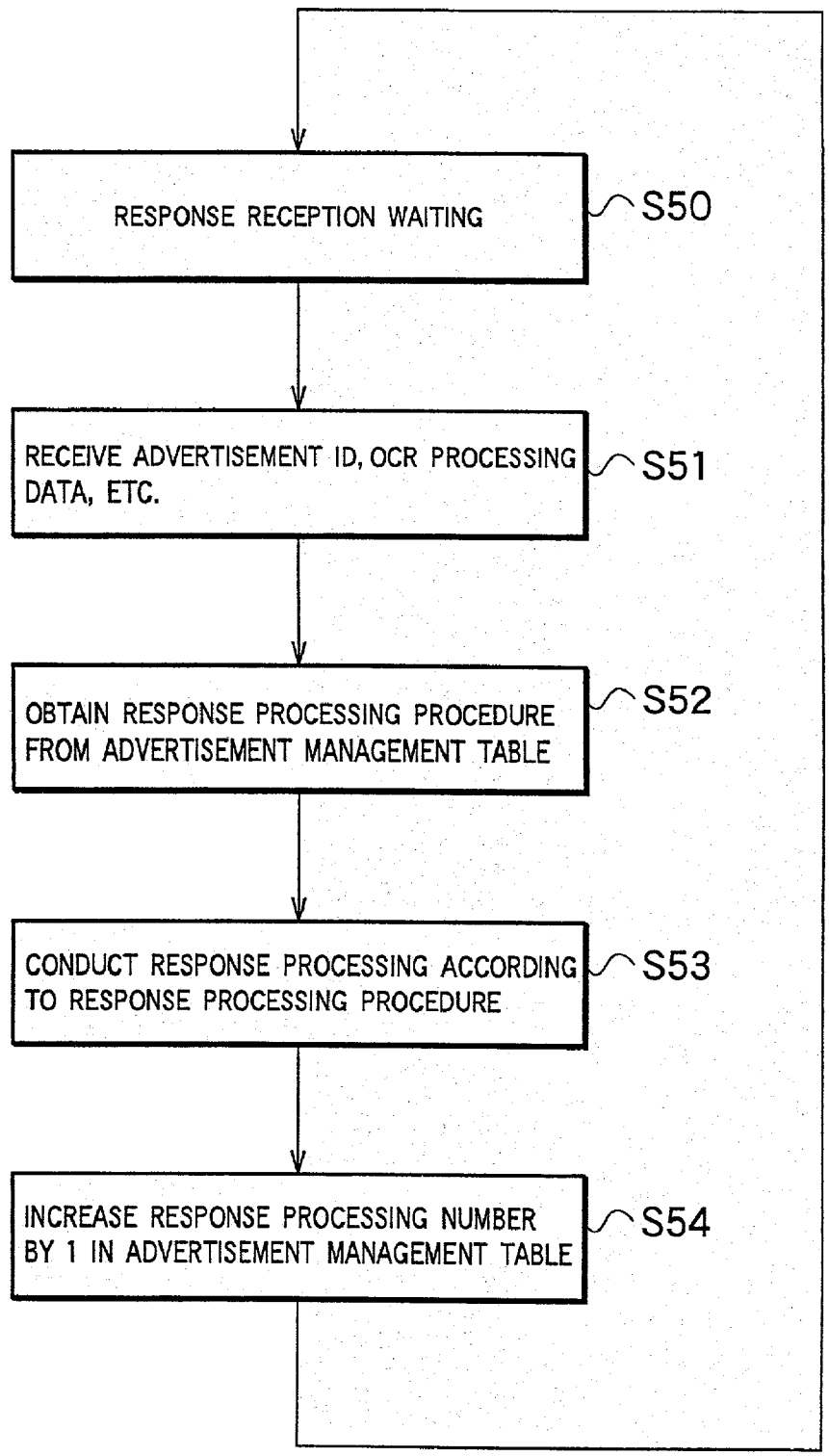
FIG. 13 is a flowchart showing an operation of an advertisement distribution server for use in the advertisement distribution system according to the embodiment of the present invention.

The flowchart of FIG. 8 includes steps of S10 to S16; the flowchart of FIG. 10 includes the steps of S20 to S29; the flowchart of FIG. 12 includes steps of S40 to S46; and the flowchart of FIG. 13 includes steps of S50 to S54.

The flowchart of FIG. 8 shows advertisement distributing operations conducted by the advertisement distribution server 102. The advertisement distribution server 102 starts, after the registration of advertisement is completed, distribution of advertisement to the facsimile terminals 14 to 16 of the users U1 to U3, the distribution being conducted periodically at a predetermined time interval, or at timings according to a predetermined distribution schedule.

In FIG. 8, when the respective jobs constituting the advertisement distribution (hereinafter each job constituting the advertisement distribution will be referred to as "distribution job") are generated periodically at a predetermined time interval or at timings according to the distribution schedule (S10), the advertisement management table AT1 shown in FIG. 3 is retrieved while employing the advertisement ID, which is contained in the distribution job, as a retrieval key, whereby the target group ID and a value to pointer to the advertisement data are obtained as a result of the retrieval (S11).

When the target group management table TT1 shown in FIG. 5 is retrieved while employing the target group ID as a retrieval key, a contractor ID list is obtained as a result of the retrieval (S12). Concurrently with this, through the pointer to the advertisement data, the body of the advertisement data shown in FIG. 6, which is distributed to each contractor by way of the advertisement distribution, is obtained.

The contractor ID list usually contains one or more contractor IDs, so that, for example, contractors who are expected to be transmission-destinations (the contractors correspond to the facsimile terminals in a one-to-one relationship) are sequentially selected, for example, according to the order in the list (S13), and then the advertisement data is transmitted to the selected contractors via facsimile (S14).

For concretely designating the facsimile number of the transmission-destination in the facsimile transmission at step S14, it is necessary to retrieve the facsimile lending contractor management table CT1 in FIG. 4 while employing the contractor ID as a retrieval key, so as to obtain the value of the transmission-destination as a result of the retrieval. However, if the public line 113 is the store-and-forward switching network and accordingly the network itself has a broadcasting function, the broadcasting function of the network can be utilized.

When the facsimile number of a contractor is designated and facsimile transmission at step S14 is conducted to the designated contractor, the value of the advertisement printed times corresponding to the contractor in the facsimile lending contractor management table CT1 is incremented (S15), and then it is judged whether or not the distribution is terminated (S16).

In the judgment at the step S16, it is judged whether or not retrieval with respect to all the contractors in the list are completed by checking whether or not the incremented value obtained at the step S15 has reached the number of all the contractors in the contractor ID list obtained at the step S12. If the retrieval has not been completed, the step S16 branches to the NO side, and then the loop consisting of the steps S13, S14, S15 and S16 is repeatedly executed. Accordingly, the number of repetition of this loop equals to the number of the contractor IDs contained in the list.

If the contractor ID of the contractor U1 is contained in the list, the contractor U1, who corresponds to the facsimile terminal 14, receives the distribution of the advertisement data from the facsimile terminal 14 by way of one processing of the repeatedly executed loop.

When the distributions with respect to all the contractors in the list are completed, and then the step S16 branches to the YES side, the processing returns to the step S10, where generation of a new distribution job is awaited.

On the other hand, the operations of the facsimile terminal (for example, the facsimile terminal 14) which receives the distribution of the advertisement data are as shown in FIG. 10. Since the operations conducted by the facsimile terminals 14 to 16 within the advertisement distributing system are the same thereamong, the following descriptions will be made focusing on the facsimile terminal 14 which is operated by the contractor U1.

In FIG. 10, when the facsimile terminal within the advertisement distributing system, such as the facsimile terminal 14, is in the facsimile receipt waiting state (S20), the external interface 34 receives the facsimile data via the public line 113. Possible examples of the facsimile data received at this time include the advertisement data distributed by the advertisement distribution server 102 in accordance with the flowchart in FIG. 8, and ordinary facsimile data other than the advertisement data.

Next, a judgment is made as to whether or not the received facsimile data is the advertisement data (S21). The judgement is made by checking whether or not the arrangement of the received facsimile data conform to the format shown FIG. 6. This is because advertisement data is arranged in accordance with a predetermined logical format, such as the format as shown in FIG. 6, and accordingly the judgment can be made by checking whether or not the data conform to such a format.

When a negative judgement result is obtained that the received facsimile data is not advertisement data, the step S21 branches to the NO side, followed by ordinary facsimile receipt (S22), and then the received facsimile data is print-output on a predetermined sheet P2 (S23). Subsequent to the print-outputting, the processing returns to the step S20.

Here, if the storage means 38 has a receiving buffer memory, it is possible to receive and process new facsimile data before completing the processing as to previously received facsimile data conducted at the steps S21 to S23. This feature, enabled by the receiving buffer memory, is also applicable to the case shown in FIG. 12, and so on.

Further, if a real time OS, which ensures an upper limit (longest time) with respect to processing time and response time, is loaded as the operating system (OS) of the facsimile terminal, the time taken from receipt of the facsimile data to output thereof can be significantly shortened.

Where the received facsimile data is advertisement data and accordingly the step S21 branches to the YES side, the processing proceeds to step S24. At the step S24, an advertisement ID is obtained from the advertisement ID section E1, printing data is obtained from the printing data section E2, and a response processing procedure is obtained from the response processing data section E3 (S24).

The response processing procedure thus obtained is stored in the response processing management table MT1 together with the advertisement ID (S25).

The timing and order of execution of the response processing depends on the operation conducted by the user U1. Accordingly, it is not necessarily ensured that response processing to the advertisement is conducted immediately after the print-outputting of the advertisement. Also, it is not necessarily ensured that, when a plurality of advertisements are print-output, response processings to the respective advertisements are conducted in the same order as the order in which the advertisements are print-output. Accordingly, it is necessary to preserve the response processing procedure in the response processing table MT1 together with the associated advertisement ID.

Next, the advertisements are printed according to the print data obtained from the print data section E2 in the received advertisement data (S26), and the value of the expendable used number (consumption degree) in the expendable management table DT1 is so updated as to increase according to the manner that the printing is conducted. For example, as the number of the print-output sheets P2 for a unit of advertisement data increases, range of increase in the expendable used number surely gets large with regard to sheet, and tends to get large with regard to ink.

To be exact, even where printing is conducted on the same one paper sheet P2, ink consumption amount depends on cases. Specifically, with respect to the contents of the data, as the proportion of black print area (or colored print area), which consumes ink, increases, the ink consumption amount increases, whereas as the proportion of white print area (or colorless print area) increases, which consumes no ink, the ink consumption amount decreases. Further, ink consumption amount depends also on the density of the black print area. Accordingly, it is possible, if desired, to conduct exact management of the expendable used number in which these conditions are reflected. However, such exact management would increase the operational load imposed on the processing capacity of the facsimile terminal 14 (or the advertisement server 102). In view of the foregoing, this embodiment employs, from the practical viewpoint, an efficient way in which the expendable used number (consumption degree) is managed based on only the number of pages printed.

The step S27 in FIG. 10 corresponds to this efficient way in which the expendable used number is increased by N (N is an integer) indicative of the printed page number.

Next, at step S28, it is judged whether or not the printing of the advertisement data is terminated normally. If the printing is not terminated normally, for example, due to sheet jam, the processing branches to the NO side, whereas if the printing terminated normally, the processing branches to the YES side.

When the processing branches to the NO side, the steps S26 and S27 are repeated again.

When the processing branches to the YES side, the latest value of the expendable used number N is transmitted to the advertisement distribution server 102 together with the contractor ID (S29), and the processing returns to the step S20. Along with the processing at the step S29, the value of the expendable used number in the expendable management table DT1 is also updated, not to mention.

In the advertisement distribution server 102, the content (i.e., value of expendable used number) of the facsimile lending contractor management table CT1 can be updated on the basis of the contractor ID and the expendable used number N which are returned from the facsimile terminal 14. When it is judged that the expendable used number N reaches a degree to which replacement of ink or paper in the facsimile terminal is needed, the above-mentioned recovery measure is taken in the following manner. Specifically, according to the value (content) of the expendable number recovery method in the facsimile lending contractor management table CT1; the advertisement distribution server 102 transmits, to the service agent system 26, a message ME4 instructing resupply of the consumed resource itself; or the server 102 transmits, to the financial organization system 25, a message ME3 informing that an actual expense needed for the resupply will be transferred to the contractor's account at the financial organization system 25. In the former case where the consumed resource itself is resupplied, the consumed resource is delivered to the user U1, for example, by a delivery staff SE1 of the service agent SF.

In the above cases, if necessary, instead of transmitting the message ME3 or ME4, items needed for recovery of the expendables (for example, address and name of the contractor, and kind of expendable to be resupplied) may be print-output by using the monitor device 107, keyboard 133, and printer 108.

The method, in which the expendable used number N is returned from the facsimile terminal to the advertisement distribution server 102 each time the printing of the advertisement data is completed, is preferable in that management of the expendable number at the facsimile terminals 14 to 16 can be conducted all the time in an accurate manner. However, this method is not necessarily advantageous in view of the problems that the traffic of the public line 113 is increased, and that a communication fee is imposed on the user U1 as to the transmission because the transmission conducted for informing the expendable used number is the same as ordinary facsimile data transmission when viewed from the public line 13.

To eliminate these problems, a configuration may be adopted, in which, until the value of the expendable used number reaches a predetermined value, management of the expendables is conducted by using only the expendable management table DT1 provided in the facsimile terminal 14, and when the value of the expendable number reaches the predetermined value or greater, the step S29 is executed for the first time.

Next, by way of the flowchart of FIG. 12, descriptions will be made as to the operations related to the response processing which is executed, after print-outputting of the advertisement is completed, by the facsimile terminal 14 in response to an operation executed by the user U1. The response processing is processing in which a response made by the user U1 to the distributed advertisement is processed. In the flowchart of FIG. 12, the operations which the user U1 needs to perform are the same as those performed in the ordinary facsimile transmission.

In FIG. 12, the facsimile terminal 14 is always in a scan waiting state while the facsimile terminal 14 is in the state which allows facsimile data transmission (S40).

When the user U1 causes the paper manuscript (i.e., a manuscript written on a sheet of paper) to be scanned for transmitting data thereof via facsimile, if the paper manuscript is the response sheet, the bar code is read separately from the other image data which will be transmitted via facsimile (S41). The bar code itself may be included in the data to be transmitted via facsimile to the advertisement distribution server 102, or may not be included therein.

Then, on the basis of a judgment on whether or not the reading of the bar code is conducted, it is judged whether or not the paper manuscript is a response sheet (S42).

When a judgment is made that the reading of the bar code is not conducted, the step S42 branches to the NO side, and the image data obtained by the scanning is transmitted via facsimile as ordinary facsimile data (S43), and then the processing returns to the step S40.

In contrast, when a judgment is made that the reading of the bar code is conducted, the step S42 branches to the YES side, and then the advertisement ID is detected from the image data obtained by the scanning. The response processing management table MT1 is retrieved while employing the advertisement ID as a retrieval key, and the response processing to be executed at the side of the facsimile terminal side 14 is obtained as a result of the retrieval. Alternatively, a configuration may be adopted in which the advertisement ID is displayed by means of the bar code, whereby the detection of the response sheet and the detection of the advertisement ID are conducted at a time.

The processing conducted at the next step of step S45 is processing conducted on the basis of the response processing procedure. At step 45, optical character recognition (OCR) processing is conducted, for example. In the case where the questionnaire portion, corresponding to the response sheet, is disposed at an area of a page (that is, at another area, an advertisement is disposed), it is necessary to execute the OCR processing only to the area corresponding to the questionnaire portion. Further, it is desirable that the set values related to the OCR processing are changed according to the layout of the response sheet. It is preferred that the above-mentioned changing of the setting values is described in the response processing procedure. The data obtained through the OCR processing is transmitted as a character code, not as image data, to the public line 113.

Following the step S45, the character codes obtained through the OCR processing, the image data obtained through the scanning, and so on are returned to the distribution server 102 (S46), and then the processing returns to S40. The advertisement ID, which plays an important role, may be returned as image data. Alternatively, as required, the advertisement ID is subjected to OCR processing so as to be returned in the form of character code (when the advertisement ID is returned in the form of character code, it is necessary to print characters corresponding to the advertisement ID on the paper P2 when the advertisement is print-output). If the contractor ID is returned in the form of character code, it is more probable that the transmission quality is enhanced. However, it is assumed here that the advertisement ID is returned in the form of image data. As in the case of the advertisement ID, it is preferred that the contractor ID is also returned to the advertisement server. Note that, since each of the contractor Ids is so determined as to uniquely identify one facsimile terminal, a modified configuration can be adopted in which the facsimile terminal 14 transmits the data automatically without providing the step of reading the contractor ID via the scanning or OCR processing.

The operations of the advertisement distribution server 102, which receives the data thus returned, are shown in the flowchart of FIG. 13.

In FIG. 13, while the advertisement distribution server 102 is in a response receipt waiting state (S50), the advertisement distribution server 102 receives the image data such as advertisement ID and character code obtained as a result of the OCR processing, which are transmitted from the facsimile terminal 14 at the step S46 (S51).

The advertisement management table AT1 is retrieved while employing the advertisement ID as a retrieval key. As a result of the retrieval, a pointer to the advertisement data is obtained. By using the pointer, a response processing procedure to be executed at the server side (hereinafter, referred to as "server-side response processing procedure") is obtained from the server side response processing procedure portion E32 in the advertisement data in FIG. 6 (S52).

Not to mention, this processing of obtaining server-side response processing procedure can be made more efficient by providing a server-side processing procedure as a data item of the advertisement management table AT1.

Next, the advertisement distribution server 102 executes response processing as to a response to the advertiser in accordance with the server-side response processing procedure (S53), and increments the value of the corresponding response processing number in the advertisement management table AT1 (S54), and then causes the processing to return to the step S50.

At the response processing conducted at the step S53, the advertisement distribution server 102 executes automatically, on the basis of the above-mentioned response processing, the following processing: Specifically, the server 102 executes: facsimile transmission to the advertiser, receipt of an inquiry via an electronic mail or the like conducted by the advertiser, a response to the inquiry, an automatic access to the advertiser's Web page, a response to the Web page obtained via this automatic access, and so on.

If the content of the questionnaire in the response sheet contains the above-mentioned application for invitation or reservation, a configuration may be adopted in which processing on such an application or reservation is processed in the server-side response processing.

In the above-mentioned descriptions, the facsimile terminal 14 conducts the OCR processing at the step S45. However, there may be a case where the facsimile terminal does not have the OCR processing function. In such a case, the OCR processing may be conducted at the advertisement distribution server 102.

According to the present embodiment, since facsimile is utilized, enhanced flexibility and promptness are obtained, and print-outputting of a large-size advertisement sheet, which is difficult to treat in a cellular phone or PC, is enabled, so that advertisement rich in expressiveness can be realized.

In addition, since the configuration is adopted in which the response information sent from the user (contractor) is returned to the advertisement distribution server, it is possible that the content of the advertisement is surely recognized by the user and that the advertisement effect is realized, thus exhibiting high reliability.

Further, since the users can enjoy, as well as the above-mentioned various advantages offered by the advertisement distribution system of the present embodiment, the benefit that they can use the system only by equipping a facsimile terminal, it is highly probable that the system of will be accepted by a wide range of users.

Further, according to the present embodiment, in terms of the entire configuration of the system, it never happens that an excessive load is applied only to a particular element or portion, or that distribution of the advertisement is hindered due to mismatching in data form. Accordingly, reliable and stable operations are enabled, and forecast and management of the advertisement effect can be easily conducted.

Although descriptions of the above-mentioned embodiment are made by way of the example of facsimile terminals, application of the present invention is not restricted to facsimile terminals.

For example, use of printer terminal or the like also enables the print-outputting of an advertisement, although the printer terminal cannot execute the response processing.

Although, in the above-mentioned embodiment, advertisements are distributed, information to be distributed is not restricted to advertisements.

What is claimed is:

1. An information distribution system including a distribution server which distributes predetermined distribution information, and a distribution terminal which receives the distribution information distributed from the distribution server and outputs the distribution information from user interface means in a predetermined output form, wherein the distribution information includes an object information element which is an object of the distribution and an objective of the output, and a control information element which controls the user interface means so as to return response information to the distribution server, the response information being generated by a user in response to the distributed object information element that corresponds to an advertisement with a questionnaire, and the distribution terminal includes user interface control means for controlling the user interface means in accordance with a content of the control information element so as to return the response information to the distribution server, and medium output means for outputting the object information element of the received distribution information in the form of recording on a predetermined recording medium, wherein the distribution terminal includes medium consumption amount monitoring means for monitoring consumption amount of the recording medium consumed for recording of the object information element so as to inform the distribution server of consumption amount information indicative of the consumption amount, and wherein the consumption amount of the recording medium as monitored by the medium consumption amount monitoring mean corresponds to only prints and outputs of an advertisement with a questionnaire and not any other types of prints and outputs.

2. The information distribution system according to claim 1, wherein the object information element is advertisement information having a questionnaire portion, and the response information is information which is entered by the user in accordance with an arrangement of the questionnaire portion.

3. The information distribution system according to claim 1, wherein the distribution terminal is a facsimile terminal which has a transmission information judging unit in the user interface control means;

the object information element has a questionnaire portion, and distribution information indicative portion indicating that a concerned information is distribution information; and when the user transmits a recording-completed recording medium by means of the facsimile terminal, the recording-completed recording medium being obtained in a manner that the user enters response information in a recording-completed recording medium in accordance with an arrangement of a questionnaire area, the recording-completed recording medium being output from the facsimile terminal and containing a questionnaire area and a distribution information displaying area, the questionnaire area corresponding to the questionnaire portion, and the distribution information displaying area corresponding to the distribution information displaying portion; the transmission information judging unit makes a judgment, which is made by verifying whether or not the distribution information displaying area exists in the recording medium, on whether or not the recording medium is transmitted for returning the response information to the distribution server, and executes processing in accordance with the control information element when a judgment is made that the recording medium is transmitted for returning the response information to the distribution server.

4. The information distribution system according to claim 1, wherein the distribution server includes a medium consumption recovering means which receives the consumption amount information and executes recording medium recovery processing which contributes to, at least, recovering the consumption amount indicated by the consumption amount information.

5. The information distribution system according to claim 1, wherein the distribution server includes data base means for accumulating and managing attribute information as to the user obtained through an investigation work conducted when the distribution terminal is lent or sold to the user or through an investigation processing conducted via a network, and executes distribution of the distribution information in accordance with the attribute information.

6. The information distribution system according to claim 1, wherein the distribution server includes response information coping means for accumulating and processing the response information received from the distribution terminal.

7. An information distribution service including a distribution server which distributes predetermined distribution information, and a distribution terminal which receives the distribution information distributed from the distribution server and outputs the distribution information from user interface means in a predetermined output form, wherein the distribution information includes an object information element which is an object of the distribution and an objective of the output, and a control information element which controls the user interface means so as to return response information to the distribution server, the response information being generated by a user in response to the distributed object information element that corresponds to an advertisement with a questionnaire, and the distribution terminal includes user interface control means for controlling the user interface means in accordance with a content of the control information element so as to return the response information to the distribution server, and medium output means for outputting the object information element of the received distribution information in the form of recording on a predetermined recording medium, wherein the distribution terminal includes medium consumption amount monitoring means for monitoring consumption amount of the recording medium consumed for recording of the object information element so as to inform the distribution server of consumption amount information indicative of the consumption amount, and wherein the consumption amount of the recording medium as monitored by the medium consumption amount monitoring mean corresponds to only prints and outputs of an advertisement with a questionnaire and not any other types of prints and outputs.

8. The information distribution service according to claim 7, wherein the object information element is advertisement information having a questionnaire portion, and the response information is information which is entered by the user in accordance with an arrangement of the questionnaire portion.

9. The information distribution service according to claim 7, wherein the distribution terminal is a facsimile terminal which has a transmission information judging unit in the user interface control means;

the object information element has a questionnaire portion, and distribution information indicative portion indicating that a concerned information is distribution information; and when the user transmits a recording-completed recording medium by means of the facsimile terminal, the recording-completed recording medium being obtained in a manner that the user enters response information in a recording-completed recording medium in accordance with an arrangement of a questionnaire area, the recording-completed recording medium being output from the facsimile terminal and containing a questionnaire area and a distribution information displaying area, the questionnaire area corresponding to the questionnaire portion, and the distribution information displaying area corresponding to the distribution information displaying portion; the transmission information judging unit makes a judgment, which is made by verifying whether or not the distribution information displaying area exists in the recording medium, on whether or not the recording medium is transmitted for returning the response information to the distribution server, and executes processing in accordance with the control information element when a judgment is made that the recording medium is transmitted for returning the response information to the distribution server.

10. The information distribution service according to claim 7, wherein the distribution server includes a medium consumption recovering means which receives the consumption amount information and executes recording medium recovery processing which contributes to, at least, recovering the consumption amount indicated by the consumption amount information.

11. The information distribution service according to claim 7, wherein the distribution server includes data base means for accumulating and managing attribute information as to the user obtained through an investigation work conducted when the distribution terminal is lent or sold to the user or through an investigation processing conducted via a network, and executes distribution of the distribution information in accordance with the attribute information.

12. The information distribution service according to claim 7, wherein the distribution server includes response information coping means for accumulating and processing the response information received from the distribution terminal.

* * * * *